United States Patent
Fisher

[15] 3,640,015
[45] Feb. 8, 1972

[54] HUMANE ANIMAL TRAPS

[72] Inventor: Arthur Miller Fisher, Box 253, Slave Lake, Alberta, Canada

[22] Filed: Sept. 23, 1969

[21] Appl. No.: 869,993

[52] U.S. Cl. ............................................................43/83.5
[51] Int. Cl. ......................................................A01m 23/26
[58] Field of Search...................43/83.5, 95, 90, 88, 92, 96, 43/97

[56] References Cited

UNITED STATES PATENTS

| | | | |
|---|---|---|---|
| 1,089,975 | 3/1914 | Shaw | 43/81 |
| 3,204,365 | 9/1965 | Sartin | 43/81 |
| 3,411,234 | 11/1968 | Harrison | 43/97 |

*Primary Examiner*—Warner H. Camp

[57] ABSTRACT

A pair of jaws are pivotally mounted on a common shaft and have springs for biasing the jaws from an open to a closed position. A trigger is pivotally connected to an offset portion of one jaw and has a latch portion adapted to engage an offset portion of the other jaw for holding the jaws in open position. A bait holder is pivotally connected to the jaw shaft and has a portion disposed on each side of the shaft for contact with an extended arm of the trigger.

1 Claims, 2 Drawing Figures

PATENTED FEB 8 1972

3,640,015

Arthur Weller Fisher

INVENTOR

HUMANE ANIMAL TRAPS

Figure 1:
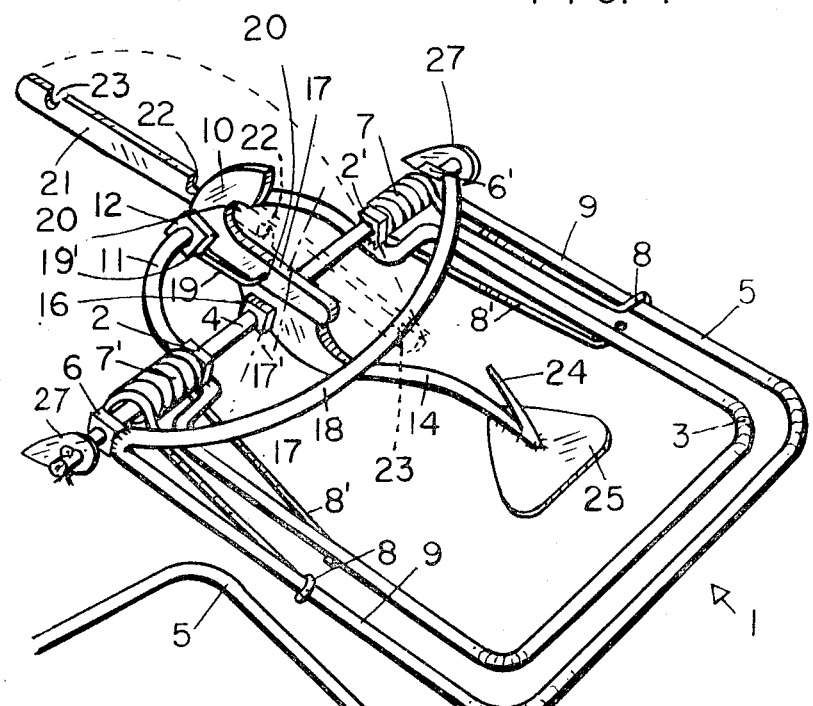
Figure 2:
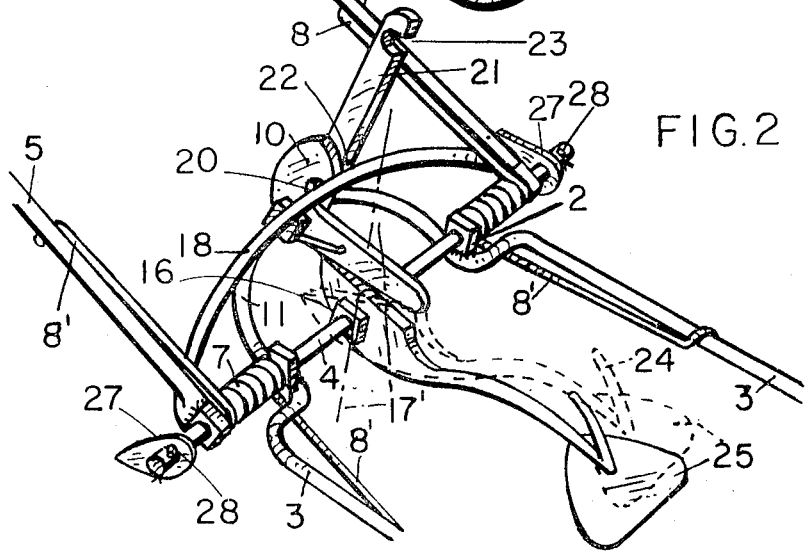

Accompanying drawings show:
FIG. 1 View of said trap with jaws closed.
FIG. 2 Fragmentary view of trap with outer jaw approaching "set" position and engagement by detent of trigger.

The numeral 1 in FIG. 1 indicates the trap assembly, 2,2' are loops integral with inner jaw 3, whereby said inner jaw is copivotal upon pivot rod 4 with outer jaw 5, loops 6,6' integral with outer jaw 5, being the means of said copivotal association. Coil springs 7,7' are sleevably included upon said pivot rod 4 between said loops 2 and 6 and 2' and 6' respectively.

Said coil springs 7,7' are mirror opposites, each being extended beyond its coiled portion to form arms 8,8', each arm 8 engaging its respectively adjacent longitudinal member 9 of outer jaw 5, and each arm 8' engaging a longitudinal arm of inner jaw 3. Arms 8 tend to constrain outer jaw 5 pivotally anticlockwise, arms 8' to constrain inner jaw 3 clockwise.

Inner jaw 3 is bent upwardly adjacent loops 2,2' to make room for trigger 10 to operate; said trigger being pivotal, within required limits, upon transverse member 11 of said inner jaw, between stops 12 (only one stop being shown in given view), said stops containing trigger 10 in position to coact with pivotal bait holder 14. Said bait holder is pivotal upon rod 4 between stops 16 (only one stop being shown in given view), said stops to contain pivotal bait holder 14 in position to coact with interpivotal extension 17 of trigger 10.

Jaw 5 is reverted adjacent loops 6,6' to form transverse member 18 and position it for engagement by trigger 10 when said jaw is opened to "set" position (FIG. 2). For greater strength said transverse member conforms to, within as close an approximation as practicable, a parabola. The curvature of member 11 of inner jaw 3 is also parabolic for the same reason.

Except when trigger 10 is actually engaging or, conversely, disengaging said transverse member 18 (see FIG. 2), said interpivotal extension 17 rests in contact, at two points, with pivotal bait holder 14, the distance separating the two said points being further divided into two distances extending in diametrically opposite directions from a line 17' drawn through interpivotal extension 17 and the long axis of said pivotal rod 4. When said bait holder 14 is pivoted upwardly (anticlockwise) the point of contact at the extremity of one of the two said distances rises upwardly and forces interpivotal extension 17 to pivot trigger 10 anticlockwise and permit transverse member 18 to be disengaged and released. It follows that the response of said trigger is impartial as to which of the two opposite said points of contact is applied.

Spring 19 is contained by recess 19' in stop 12, and by recess 20' in interpivotal extension 17 and tends to constrain said pivotal extension to maintain contact between the said extension and said bait holder 14. It follows, therefore, that opposition by said spring must be overcome before engagement by transverse member 18 can be effected by complete entry of said member into detent space 20 and also during release of said member when said trap is sprung.

Latch 21 is pivotal adjacent trigger 10. The purpose of said latch is twofold: (a) to lock said trap in "set" position whenever it may be desirable to lock in said position as a temporary measure: (b) to lock said jaws in "closed," and therefore most convenient, position for transportation. Radius position of recess 22 permits engagement of said transverse member 18 when said member is in "set" position (see 22 FIG. 1 in broken lines). In like manner, radius position of recess 23 permits said recess to engage transverse member 18 when said trap is in "jaws closed" position (see 23 FIG. 1 in broken lines).

Bait holder 14 has means 24 for securing bait, and to obtain the bait an animal will be compelled to pull upwardly and thereby cause trigger 10 to pivot towards "release" position whereby said trap is sprung. Alternatively, pan 25 of said bait holder presents a flat surface to receive pressure exerted downwardly and accomplish exactly the same result as when the pivotal displacement is upwardly.

I claim:
1. A humane self-setting animal trap comprising: an inner jaw and an outer jaw; the said jaws being copivotal upon one continuous rod; each said jaw forming a loop interconnected between its respective pivot points by, in the case of the said inner jaw, a member formed for the positioning and operation thereon of a trigger midway between the said pivot points; the said inner jaw being formed also to provide space for the sleevable positioning upon the said continuous rod of a coiled spring between each of the respective said pivot points of the said inner jaw and the respective said pivot points of the said outer jaw; the said inner jaw and the said outer jaw being biased towards closed trap position by constraint of extended arms of the said coiled springs, the said extended arms being prolonged and formed to engage with and interconnect the respective longitudinal members of the said outer jaw and of the said inner jaw; the pivot points of the said outer jaw being interconnected by a member reverted with respect to the said longitudinal members of the said outer jaw to permit the said reverted member to become engaged by the said trigger; the said trigger being biased towards the said engagement by a spring interconnecting the said trigger with one of two stops, one said stop on each side of the said trigger, to contain the plane of axial displacement of the said trigger; the said trigger being formed to provide a detent and, adjacent the said detent, to intercept the said reverted member and permit the spring-biased said trigger to react and then engage with the said reverted member; the portion of the body of the said trigger extending oppositely the said detent, with respect to the pivotal axis of the said trigger, being prolonged to overlap the axis of a bait holder pivotal about the said continuous rod whereby coaction between the said bait holder and the said overlapping portion, being contiguous with the said bait holder, can be exerted against resistance from the said bias spring of the said trigger at one side of the last said axis or, alternatively, at the opposite side of the said last axis whereby the said coaction must effect an anticlockwise displacement of the said trigger indifferently as to which side of the said axis of the said bait holder the said coaction is applied; the said bait holder prolonged towards the said inner jaw, the said prolongation embodying a pan together with means of impaling bait; upward pulling upon said bait causing the said bait holder to pivot anticlockwise and downward pressure upon the said pan causing the said bait holder to pivot clockwise; displacement of the said bait holder, clockwise or anticlockwise, causing the said trigger to disengage from the said reverted member and permit the said inner jaw and the said outer jaw to close together with lethal force by the combined constraint of the said coiled springs; a safety latch copivotal with said trigger and adjacent the one of the two said stops positioned at the opposite side of the said trigger to the stop interconnected with the said trigger by the said bias spring; said latch having a detent notch to engage the said reverted member when said jaws are open with the said trap in "set" position, and a second detent notch to engage said reverted member when the said jaws are in closed position for transportation; a spike pivotal adjacent each opposite end of said continuous rod and contained each by a pin through a hole through said continuous rod; means of securing said trap in set position to any suitable surface or object.

* * * * *